Patented June 26, 1951

2,557,986

UNITED STATES PATENT OFFICE 2,557,986

PREPARATION OF MELAMINE

Nat H. Marsh, Noroton Heights, Conn., assignor to American Cyanamid Company, New York, N. Y., a corporation of Maine No Drawing. Application November 14, 1949, Serial No. 127,253

3 Claims. (Cl. 260—249.7)

The present invention relates to the synthesis of melamine from carbon oxysulfide and ammonia under elevated temperatures and pressures.

It is an object of the present invention to prepare melamine from inexpensive raw materials. Additional objects will be evident from the discussion hereinafter.

The following example illustrates without limiting the invention.

Example 1

Into a 300 cc. rocker type autoclave there is introduced 60 g. of carbon oxysulfide and 34 g. of ammonia from their respective transfer bombs. The autoclave is sealed and heated for 1½ hours under the autogenously developed pressure at a temperature of about 350° C. At the end of this period the vessel is cooled, the pressure released, and melamine leached from the reaction mass with hot water. To separate melamine from any guanidine or ammonium thiocyanates present, the hot solution is cooled, whereby melamine is precipitated and is removed by filtration. Various other methods of recovering melamine from the reaction mass, such as vaporization and the like, are also suitable.

The proportion of reactants may vary widely but it is preferred that the ammonia:carbon oxysulfide mol ratio be at least 2:1. The temperature is not limited to 350° C. but may vary over a range of about 270°–450° C. The pressure range suitable is about 200–20,000 p. s. i. The reaction time suitable will vary with the temperature and pressure, and will, of course, be preferably reduced under conditions of high temperature and pressure but lengthened under conditions of low temperature and low pressure. At a temperature and pressure of 310° C. and 1000 p. s. i., the preferred reaction period is about 90 minutes. At high conditions of temperature and pressure, such as 400° C. and 2000 p. s. i., the reaction period may be reduce to 10 minutes and even less.

Either batch or continuous processes are feasible. In conducting the process on a continuous basis, it is preferred to charge ammonia and carbon oxysulfide in a mol ratio of 4:1 into a tubular reactor maintained at about 400° C. and about 3000 p. s. i., the charge rate is adjusted so that the contact time is about 10 minutes. The reactor effluent is reduced to atmospheric pressure and is separated into gaseous and non-gaseous fractions. The non-gaseous fraction is leached with hot water. On cooling, the leach water deposits melamine which is recovered by filtration.

While the invention has been described with particular reference to specific embodiments, it is to be understood that it is not to be limited thereto but is to be construed broadly and restricted solely by the scope of the appended claims.

I claim:

1. The method of making melamine comprising reacting carbon oxysulfide and ammonia in a closed reaction zone at a temperature of at least 270° C. and at a pressure of at least 200 p. s. i., and recovering the thus-formed melamine.

2. The method according to claim 1 in which the mol ratio of ammonia:carbon oxysulfide is greater than 1.

3. The method according to claim 2 in which the temperature is about 400° C. and the pressure is about 2000 p. s. i.

NAT H. MARSH.

REFERENCES CITED

The following references are of record in the file of this patent:

UNITED STATES PATENTS

| Number | Name | Date |
|---|---|---|
| 1,808,465 | Klemenc | June 2, 1931 |

FOREIGN PATENTS

| Number | Country | Date |
|---|---|---|
| 583,504 | Great Britain | Dec. 19, 1946 |
| 598,175 | Great Britain | Feb. 18, 1948 |